United States Patent
Oku et al.

(10) Patent No.: US 10,256,486 B2
(45) Date of Patent: Apr. 9, 2019

(54) FUEL CELL

(75) Inventors: Takanori Oku, Yokohama (JP);
Shigetaka Uehara, Kamakura (JP);
Mitsutaka Abe, Yokohama (JP)

(73) Assignee: NISSAN MOTOR CO., LTD.,
Yokohama-shi (JP)

(*) Notice: Subject to any disclaimer, the term of this patent is extended or adjusted under 35 U.S.C. 154(b) by 489 days.

(21) Appl. No.: 13/824,173

(22) PCT Filed: Apr. 3, 2012

(86) PCT No.: PCT/JP2012/059068
§ 371 (c)(1),
(2), (4) Date: Mar. 15, 2013

(87) PCT Pub. No.: WO2012/137773
PCT Pub. Date: Oct. 11, 2012

(65) Prior Publication Data
US 2013/0183606 A1    Jul. 18, 2013

(30) Foreign Application Priority Data

Apr. 5, 2011  (JP) .................................. 2011-083533

(51) Int. Cl.
*H01M 8/04* (2016.01)
*H01M 8/04082* (2016.01)
(Continued)

(52) U.S. Cl.
CPC ....... *H01M 8/04201* (2013.01); *H01M 8/026* (2013.01); *H01M 8/0273* (2013.01);
(Continued)

(58) Field of Classification Search
CPC ......... H01M 8/04201; H01M 2250/20; H01M 2008/1095; H01M 8/0273; H01M 8/026; Y02T 90/32; Y02E 60/50
(Continued)

(56) References Cited

U.S. PATENT DOCUMENTS 6,261,710 B1 *  7/2001  Marianowski ...... H01M 8/0206
                                                         429/434
6,365,295 B1 *  4/2002  Matsukawa ......... H01M 8/0254
                                                         429/456
(Continued)

FOREIGN PATENT DOCUMENTS

CN      101572318 A    11/2009
EP      1 821 357 A2    8/2007
(Continued)

OTHER PUBLICATIONS

Supplementary European Search Report dated Jul. 25, 2014, 8 pgs.

*Primary Examiner* — Jonathan G Jelsma
*Assistant Examiner* — Omar M Kekia
(74) *Attorney, Agent, or Firm* — Foley & Lardner LLP

(57) ABSTRACT

The invention provides a fuel cell (A1) in which a frame body (20) provided with a membrane electrode assembly (30) is sandwiched between a pair of separators (40, 41), and multiple projections (21) are arranged at given intervals on each of two surface sides of the frame body (20). Thus, a gas flow path (S1) for a hydrogen-containing gas is defined and formed on one surface side of the frame body (20) and a gas flow path (S2) for an oxygen-containing gas is defined and formed on the other surface side of the frame body (20). The projections (21) on the one surface side of the frame body (20) and the projections (21) on the other surface side of the frame body (20) are arranged asymmetrically with respect to the frame body (20) in a stacking direction (α) of the fuel cell.

15 Claims, 9 Drawing Sheets

(51) Int. Cl.
　　　*H01M 8/0273* 　　(2016.01)
　　　*H01M 8/026* 　　(2016.01)
　　　*H01M 8/1018* 　　(2016.01)

(52) U.S. Cl.
　　　CPC .......... *H01M 2008/1095* (2013.01);
　　　　　*H01M 2250/20* (2013.01); *Y02T 90/32*
　　　　　　　　　　　　　　　　　(2013.01)

(58) Field of Classification Search
　　　USPC ............ 429/479, 480, 481, 482, 483, 507
　　　See application file for complete search history.

(56) References Cited

U.S. PATENT DOCUMENTS

| | | | |
|---|---|---|---|
| 2002/0006539 A1* | 1/2002 | Kubota et al. .............. | 429/44 |
| 2007/0178361 A1* | 8/2007 | Brantley ............ | H01M 8/0297 |
| | | | 429/483 |
| 2009/0042086 A1 | 2/2009 | Ishikawa et al. | |
| 2010/0098989 A1* | 4/2010 | Morimoto et al. ............ | 429/30 |
| 2011/0183227 A1* | 7/2011 | Tanaka ................ | H01M 8/0206 |
| | | | 429/457 |

FOREIGN PATENT DOCUMENTS

| | | |
|---|---|---|
| EP | 2 012 383 A1 | 1/2009 |
| EP | 2 071 656 A1 | 6/2009 |
| EP | 2 293 371 A1 | 3/2011 |
| EP | 2 584 636 A1 | 4/2013 |
| JP | 2001-085034 A | 3/2001 |
| JP | 2006-004677 A | 1/2006 |
| JP | 2006-331944 A | 12/2006 |
| JP | 2007-035296 A | 2/2007 |
| JP | 2007-207707 A | 8/2007 |
| JP | 2007-305325 A | 11/2007 |
| JP | 2008-226682 A | 9/2008 |
| JP | 2009-104922 A | 5/2009 |
| JP | 2009-170206 A | 7/2009 |
| JP | 2010-205669 A | 9/2010 |

* cited by examiner

FIG. 7
(A)
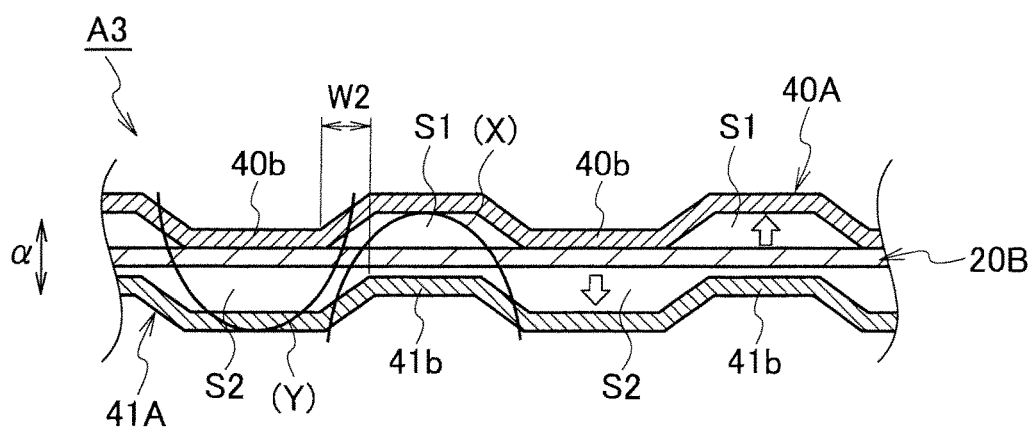
(B)
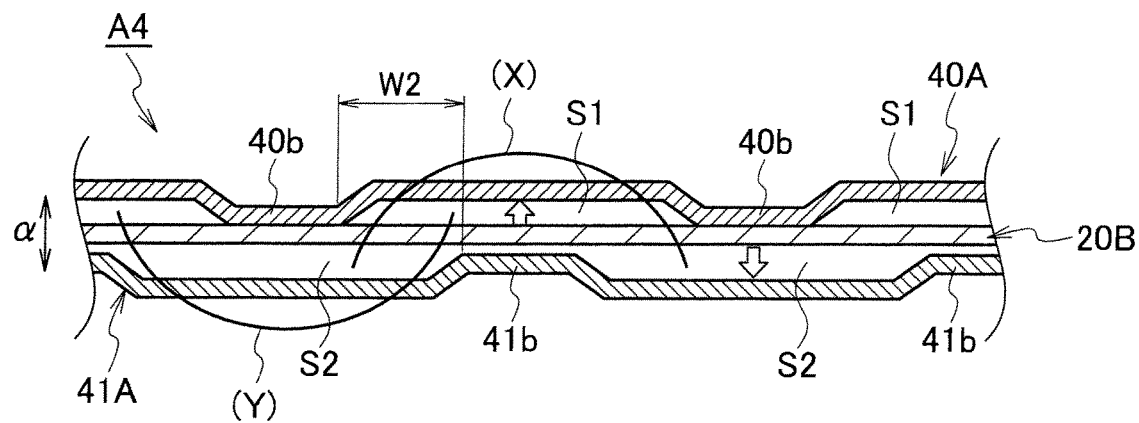

FUEL CELL

TECHNICAL FIELD

The present invention relates to a polymer electrolyte fuel cell, for example.

BACKGROUND ART

Patent Document 1 discloses "a fuel cell separator and a fuel cell including the same" as a fuel cell of this type.

The fuel cell disclosed in Patent Document 1 includes passage defining members defining reaction gas passages for supplying a reaction gas to a power generator by having contact parts projecting to and being in contact with the power generator, and projection parts projecting from the passage defining members toward the power generator in a part of the reaction gas passages. In addition, a projecting distance of each projection part is made shorter than a projecting distance of each contact part.

PRIOR ART DOCUMENT

Patent Document

Patent Document 1: Japanese Patent Application Publication No. 2010-205669

SUMMARY OF INVENTION

The fuel cell described in Patent Document 1 causes a pressure difference (hereinafter referred to as a "differential pressure") between a cathode and an anode of the power generator, which is attributed to changes in the pressure of a reaction gas. However, since the projecting distance of each projection part is made shorter than the projecting distance of each contact part, there is still a risk that the reaction gas passage is blocked as a result of deformation of the power generator due to the differential pressure.

In view of the above, an objective of the present invention is to provide a fuel cell which is capable of improving fatigue resistance without reducing a cross-sectional area for the flow of a reaction gas even when the differential pressure is repeatedly generated.

Solution to Problem

To solve the problem, in the present invention, a frame body provided with a membrane electrode assembly is sandwiched between a pair of separators, and multiple projections are arranged at given intervals on each of two surfaces of the frame body. Thus, gas flow paths for a hydrogen-containing gas are formed on one surface side of the frame body and gas flow paths for an oxygen-containing gas are formed on the other surface side of the frame body. Here, the projections on the one surface side of the frame body and the projections on the other surface side of the frame body are arranged asymmetrically with respect to the frame body in a stacking direction of a fuel cell.

BRIEF DESCRIPTION OF DRAWINGS

FIG. 7(A) is a partial cross-sectional view showing part of a fuel cell according to a third embodiment of the present invention, and FIG. 7(B) is a partial cross-sectional view showing part of a fuel cell according to a fourth embodiment of the present invention.

DESCRIPTION OF EMBODIMENTS

Figure 1:
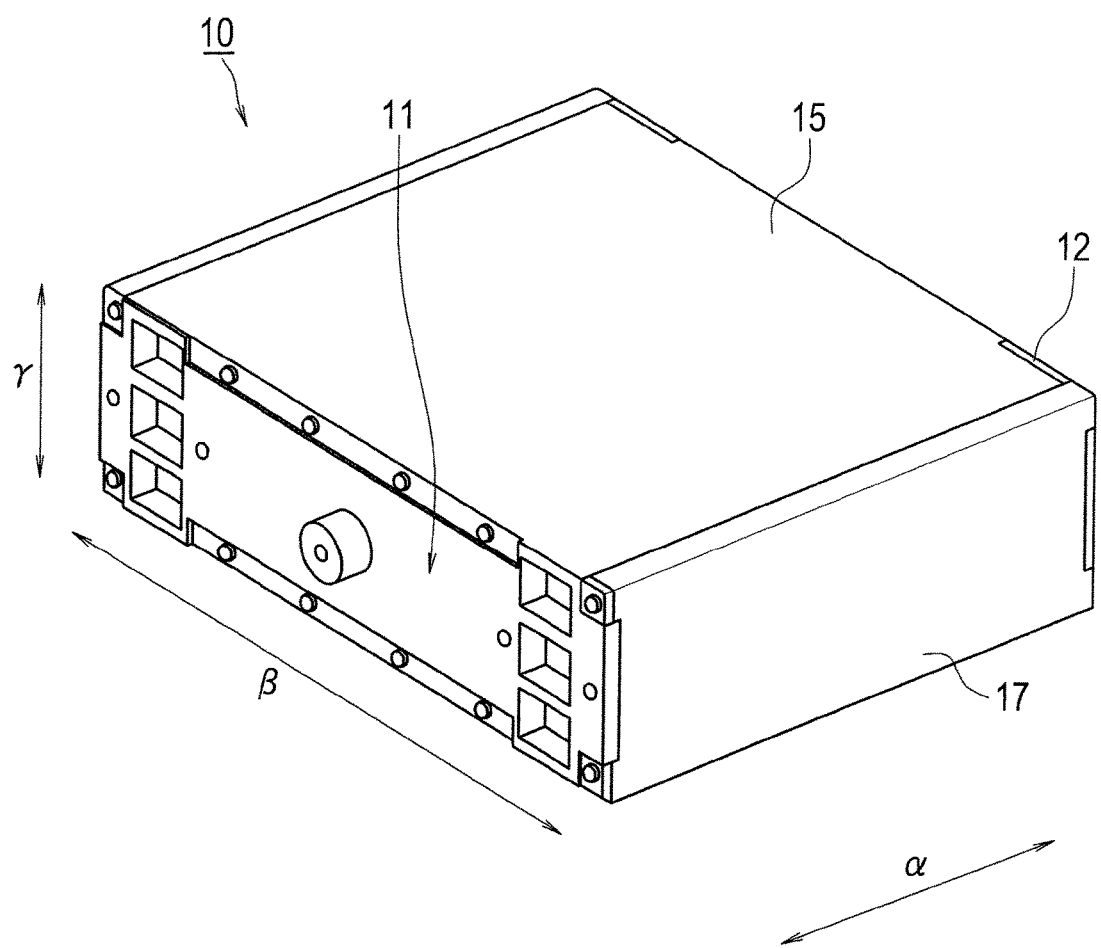
FIG. 1 is a perspective view showing an exterior appearance of a fuel cell stack using a fuel cell according to a first embodiment of the present invention.
Figure 2:
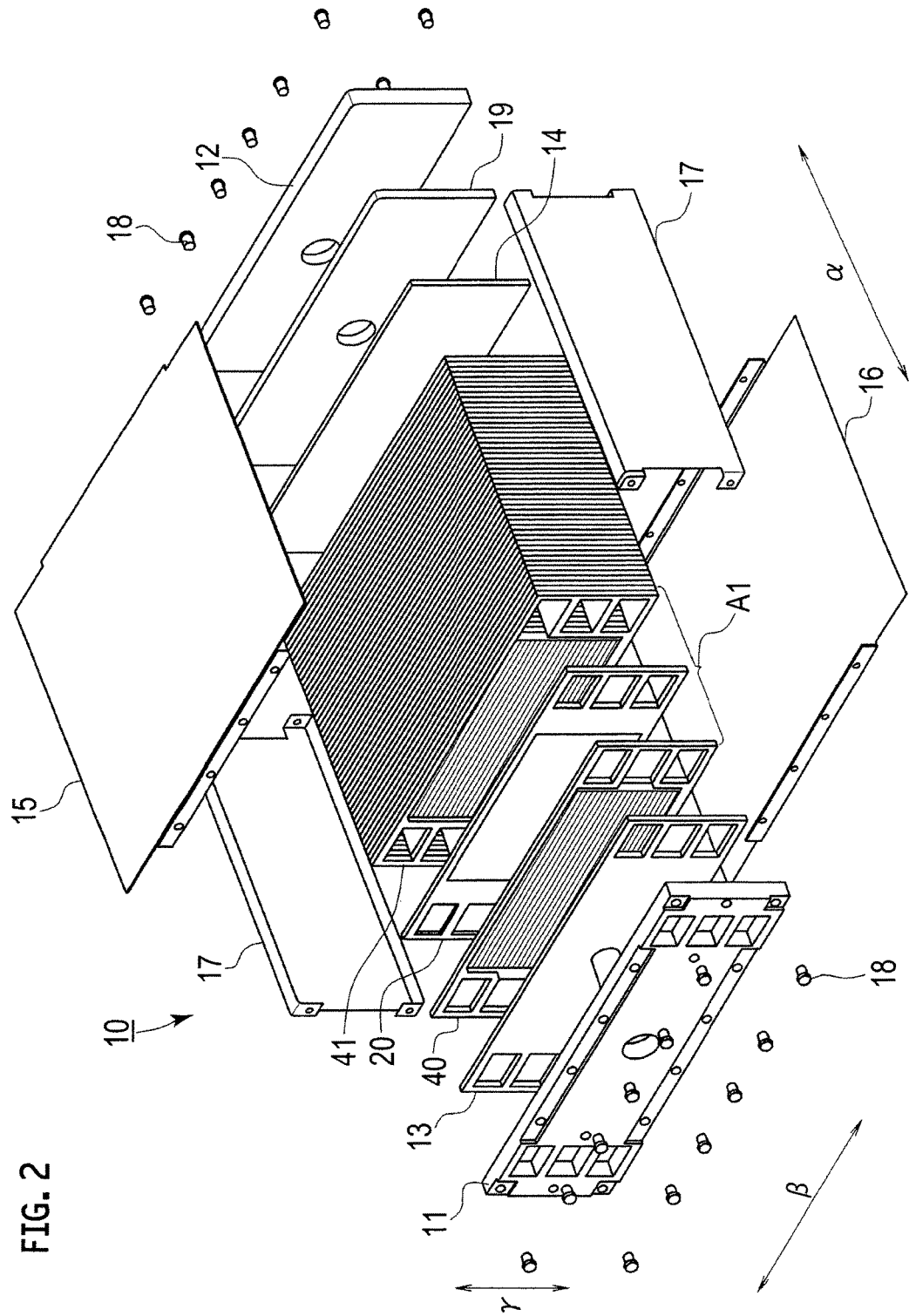
FIG. 2 is an exploded perspective view of the fuel cell stack of FIG. 1.
Figure 3:
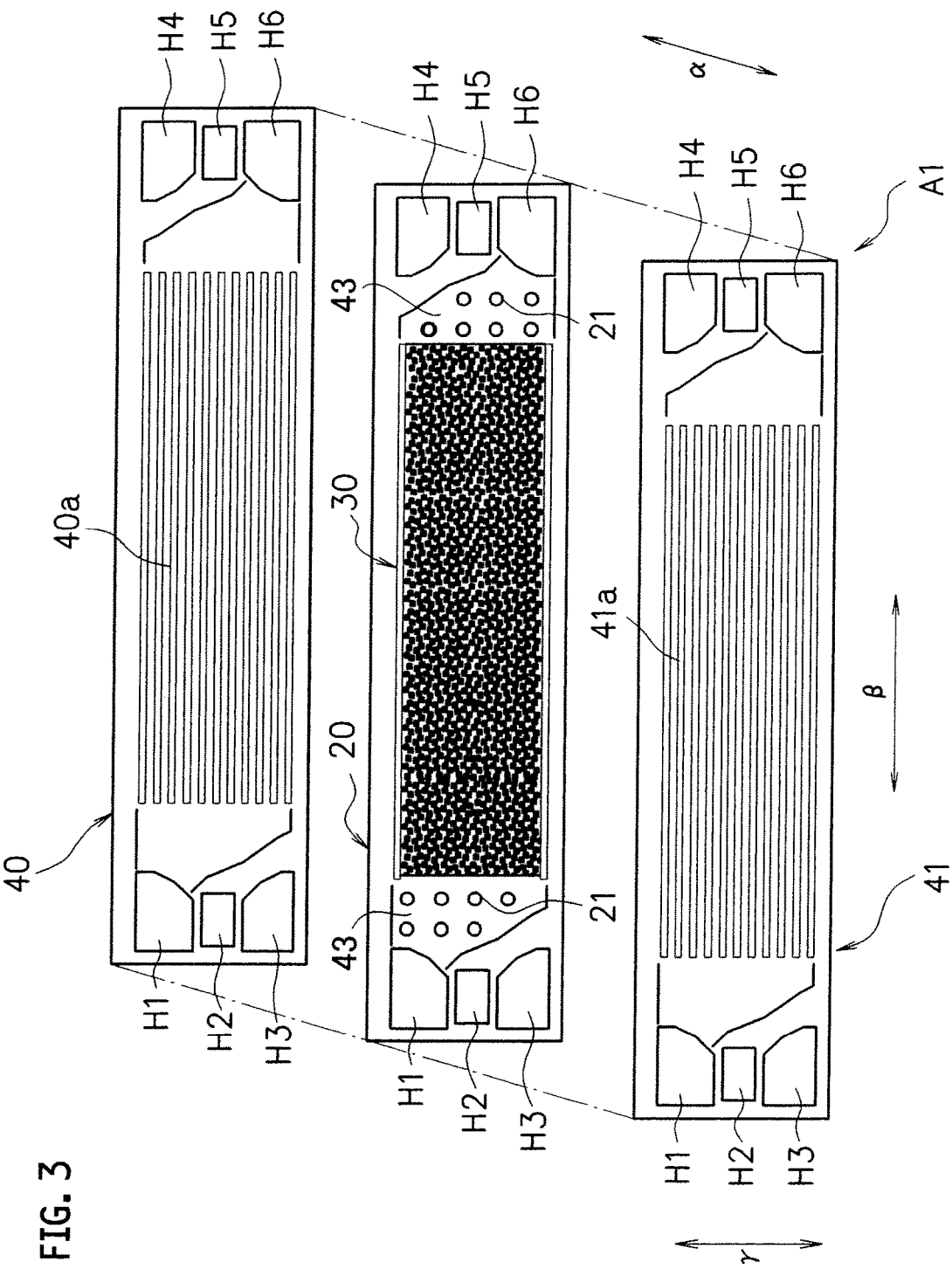
FIG. 3 is an exploded perspective view showing the fuel cell according to the first embodiment of the present invention.
Figure 4:
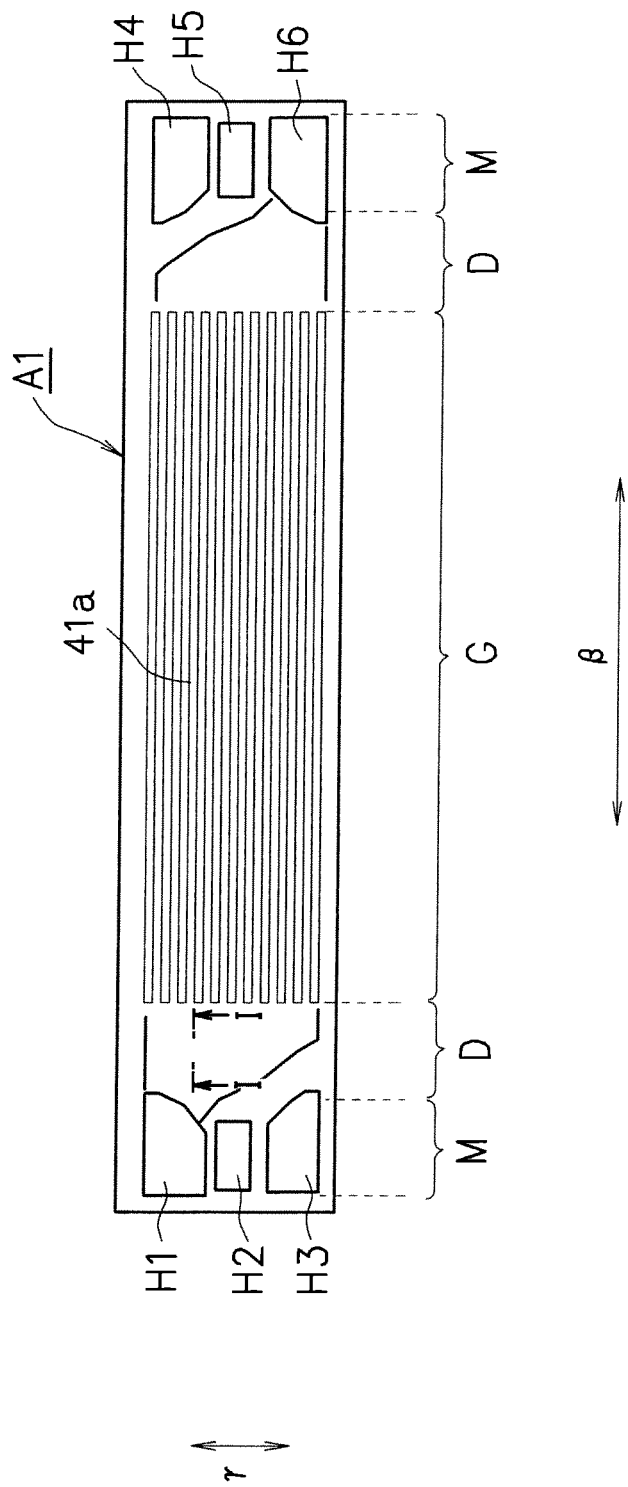
FIG. 4 is a front view of the fuel cell of FIG. 3.

Modes for carrying out the present invention will be described below with reference to the drawings. FIG. 1 is a perspective view of an exterior appearance of a fuel cell stack using a fuel cell according to a first embodiment of the present invention, and FIG. 2 is an exploded perspective view of the fuel cell stack of FIG. 1. Meanwhile, FIG. 3 is an exploded perspective view of the fuel cell according to the first embodiment of the present invention, and FIG. 4 is a front view of the fuel cell of FIG. 3.

It is to be noted that the following embodiments will describe a fuel cell stack as an example which is applicable to a polymer electrolyte fuel cell to be mounted on a vehicle.

As shown in FIGS. 1, 2, current collectors 13, 14 and multiple fuel cells A1, which are stacked together, are sandwiched under pressure from both sides (from both end sides in a stacking direction α) by a pair of end plates 11, 12. In addition, vertical and lateral sides of the current collectors 13, 14 and the multiple fuel cells A1 are covered with fastener plates 15, 16 and reinforcing plates 17, 17, thereby forming a fuel cell stack 10. Here, reference numeral 19 denotes a spacer.

In this embodiment, the end plates 11, 12, the fastener plates 15, 16, and the reinforcing plates 17, 17 are fastened to one another with bolts 18 and the like. However, the present invention is not limited to this configuration.

As shown in FIGS. 3, 4, in the fuel cell A1, a frame body (hereinafter referred to as a "frame") 20 provided with a membrane electrode assembly 30 is sandwiched between a pair of separators 40, 41. Thus, a power generation unit G is formed in a region opposed to the membrane electrode assembly 30.

As shown in FIG. 4, in the fuel cell A1, manifold units M, M for supplying and discharging any of a hydrogen-containing gas and an oxygen-containing gas, and diffuser units D, D being flow regions for any of the hydrogen-containing gas and the oxygen-containing gas from the manifold units M to the power generation unit G, are formed at each of two sides of the power generation unit G.

As shown in FIGS. 3, 4, the manifold unit M on one side (a left end portion shown in FIGS. 3, 4) includes manifold holes H1 to H3. The manifold holes H1 to H3 serve to supply the oxygen-containing gas (H1), to supply cooling fluid (H2), and to supply the hydrogen-containing gas (H3), respectively. The manifold holes H1 to H3 define the respective flow paths along the stacking direction α.

The manifold unit M on the other side (a right end portion shown in FIGS. 3, 4) includes manifold holes H4 to H6. The manifold holes H4 to H6 serve to discharge the hydrogen-containing gas (H4), to discharge the cooling fluid (H5), and to discharge the oxygen-containing gas (H6). The manifold holes H4 to H6 defines the respective flow paths along the stacking direction α. Here, positions of some or all of the supplying holes and the discharging holes may be inverted.

Next, the membrane electrode assembly 30 will be described.

The membrane electrode assembly 30 is also referred to as an MEA, and has a structure in which an electrolyte membrane made of a solid polymer, for example, is sandwiched between an anode and a cathode (neither of which is shown).

In this embodiment, a gas diffusion layer made of carbon paper, a porous body or the like is laminated on a surface of each of the anode and the cathode.

The membrane electrode assembly 30 generates power by means of an electrochemical reaction when the hydrogen-containing gas is supplied to the anode and the oxygen-containing gas is supplied to the cathode, respectively. Note that the membrane electrode assembly 30 may be formed of the electrolyte layer, the anode, and the cathode without providing the gas diffusion layers.

Figure 5:
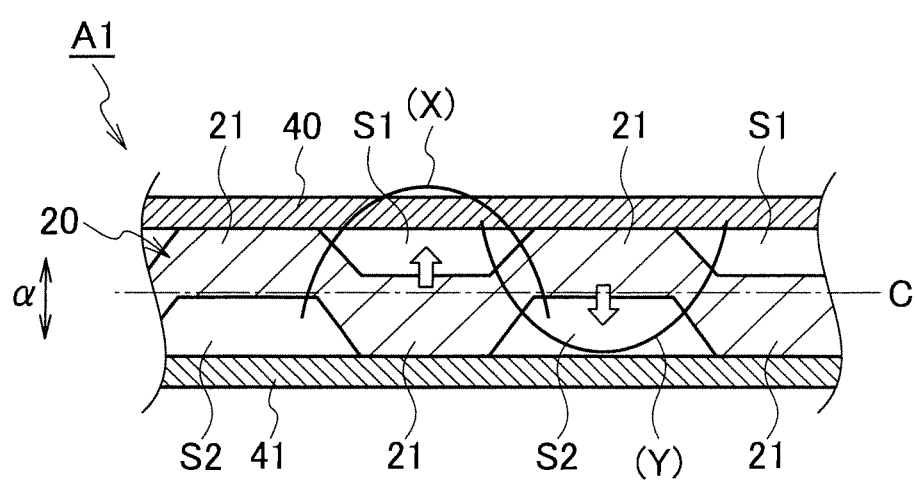
FIG. 5 is a partial cross-sectional view taken along the I-I line in FIG. 4.

Next, the frame 20 will be described. FIG. 5 is a partial cross-sectional view showing the fuel cell A1 according to the first embodiment of the present invention, in the form of a cross section taken along the I-I line indicated in FIG. 4. Each arrow shown in FIG. 5 indicates a differential pressure, code (X) indicates a bending moment on the frame 20 generated when the pressure of the oxygen-containing gas is higher than that of the hydrogen-containing gas, and code (Y) indicates a bending moment on the frame 20 generated when the pressure of the hydrogen-containing gas is higher than that of the oxygen-containing gas.

The membrane electrode assembly 30 is formed integrally with the frame 20 by injection molding, for example. In this embodiment, the frame 20 is formed into a horizontally long rectangle in a front view seen in the stacking direction α of the fuel cell A1. Meanwhile, the frame 20 is formed into a substantially uniform plate thickness and the membrane electrode assembly 30 is located at a central part of the frame 20 in the vertical and horizontal directions.

The diffuser units D are respectively formed between the frame 20 and each of the separators 40, 41, i.e., on an anode side and a cathode side (two surface sides) of the frame 20. To be more precise, multiple projections 21 formed into the same truncated cone shape of the same size are formed integrally with the frame 20 at given intervals. Here, a ratio between a height from a bottom surface (a base portion) to an upper base (an upper portion) and a width dimension of the bottom surface of each projection 21 may be set as appropriate.

The projections 21 make the frame 20 and each of the separators 40, 41 opposed to the frame 20 away from each other in the direction of α as shown in FIG. 5. In the meantime, hydrogen-containing gas flow paths S1 and oxygen-containing gas flow paths S2 are formed by arranging the multiple projections 21 at given intervals on each of the diffuser units D. The hydrogen-containing gas flow paths S1 and the oxygen-containing gas flow paths S2 will be hereinafter simply referred to as the "gas flow paths S1, S2".

In this embodiment, the projections 21 on the anode side (the one surface side) of the frame 20 and the projections 21 on the cathode side (the other surface side) of the frame 20 are arranged asymmetrically with respect to the central axis C of the frame 20 in the stacking direction α of the fuel cell A1 (the center of the frame 20 in the direction of α). That is to say, the projections 21 are arranged in such a manner that the gas flow paths S1 and the gas flow paths S2 are formed into asymmetrical shapes with respect to the frame 20 in the stacking direction α of the fuel cell A1.

In this embodiment, as shown in FIG. 5, the projections 21 on the cathode side (the other surface side) are arranged opposite the gas flow paths S1 on the anode side (the one surface side), and the projections 21 on the anode side (the one surface side) are arranged opposite the gas flow paths S2 on the cathode side (the other surface side). In other words, the projections 21 in the respective flow regions for the hydrogen-containing gas and the oxygen-containing gas are arranged in such a manner as not to be opposed to each other.

Each of the separators 40, 41 is formed by pressing a metal plate made of stainless steel or the like. As shown in FIGS. 3, 4, a central portion of each separator opposed to the membrane electrode assembly 30 is formed into a bumpy shape, in which each hump is continuous in a direction β. In addition, manifold holes H1 to H6 having the same shapes and the same sizes as the corresponding manifold holes H1 to H6 in the frame 20 are formed at both lateral sides of the central portion in such a manner as to be opposed to the corresponding manifold holes H1 to H6 in the frame 20.

Accordingly, in bumpy portions 40a, 41a of the separators 40, 41 opposed to the membrane electrode assembly 30, each projecting portion is in contact with the membrane electrode assembly 30 and each receding portion constitutes a flow path for the hydrogen-containing gas (or the oxygen-containing gas).

According to this embodiment, portions where stresses are generated due to differential pressures are dispersed in the in-plane direction of the frame 20. In particular, as shown in FIG. 5, a stress is generated due to the bending moment X at a position where the differential pressure toward the separator 40 from the separator 41 is generated (a portion indicated by the up arrow in FIG. 5). Similarly, a stress is generated due to the bending moment Y at a position where the differential pressure toward the separator 41 from the separator 40 is generated (a portion indicated by the down arrow in FIG. 5). Thus, the bending moment X is displaced with respect to the bending moment Y in the in-plane direction. Accordingly, the portions where the stresses are generated due to differential pressures are dispersed in the in-plane direction of the frame 20. Thus, the stress amplitude can be reduced. In addition, the structural fatigue resistance can be increased without reducing a cross-sectional area for the flow of a reaction gas. Moreover, the section modulus of each stress-generating portion can be increased by partially increasing the plate thickness of the frame 20.

Figure 6:
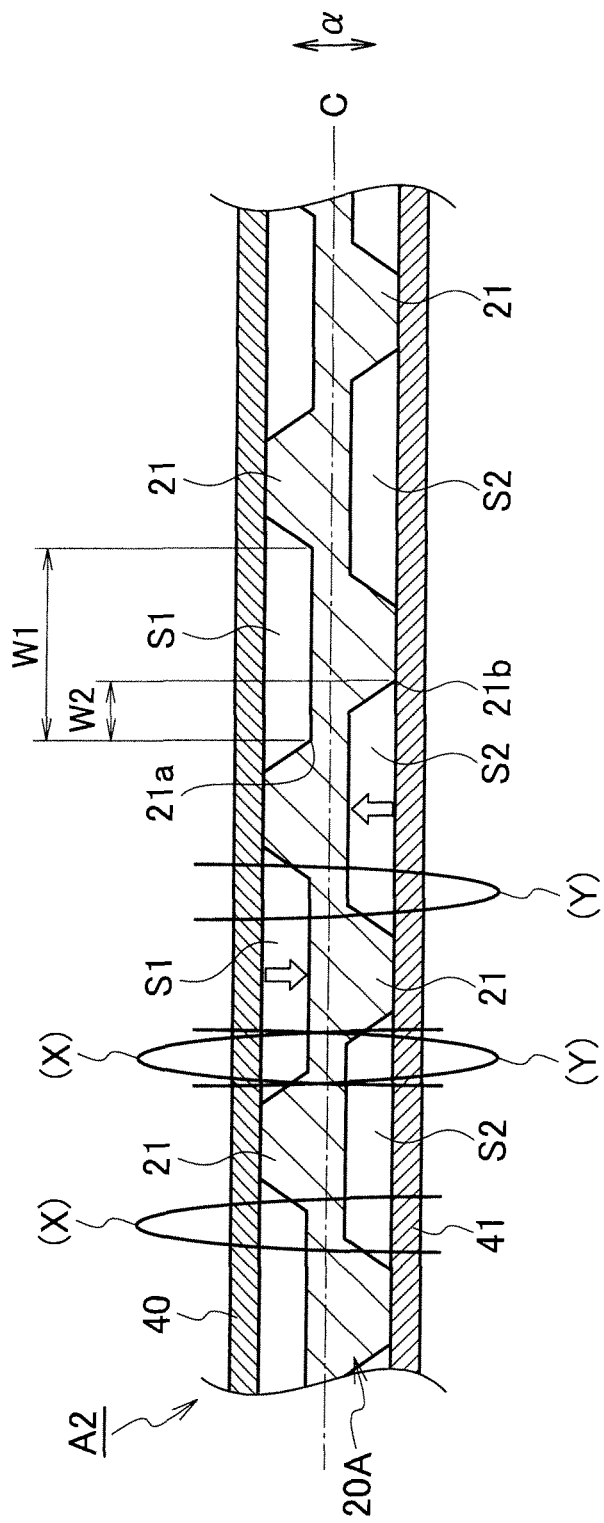
FIG. 6 is a partial cross-sectional view showing part of a fuel cell according to a second embodiment of the present invention.

FIG. 6 is a partial cross-sectional view showing a cross section of part of a fuel cell according to a second embodiment of the present invention. Each arrow shown in FIG. 6 indicates a differential pressure, code (X) indicates a bending moment generated on a frame 20A when the pressure of the oxygen-containing gas is higher than that of the hydrogen-containing gas, and code (Y) indicates a bending moment on the frame 20A generated when the pressure of the hydrogen-containing gas is higher than that of the oxygen-containing gas.

A fuel cell A2 according to the second embodiment of the present invention has different intervals of arrangement of the projections 21 from those in the fuel cell A1 of the first embodiment.

Specifically, the intervals of arrangement of the projections 21 in a fuel cell A2 are wider than the intervals of arrangement of the projections 21 in the fuel cell A1. In other words, each of the gas flow paths S1, S2 is formed to have a width dimension of a dimension W1 which is wider than each interval of arrangement of the projections 21 in the fuel cell A1. Meanwhile, an interval between a base portion 21a of a certain projection 21 on the one surface side of the frame 20A and a corner portion 21b of the corresponding projection 21 on the other surface side thereof is set to a dimension W2. Here, the dimension W2 may be set in consideration of a factor such as the bending moment to be generated.

According to this embodiment, the dimension W2 representing the interval between the certain projection 21 on the one surface side and the corresponding projection 21 on the other surface side can be reduced. Thus, it is possible to reduce a stress generating on the frame 20A at a position between each projection 21 on the one surface side and the corresponding projection 21 on the other surface side.

FIG. 7(A) is a partial cross-sectional view showing a cross section of part of a fuel cell according to a third embodiment of the present invention, and FIG. 7(B) is a partial cross-sectional view showing a cross section of part of a fuel cell according to a fourth embodiment of the present invention. Each arrow shown in FIG. 7 indicates a differential pressure, code (X) indicates a bending moment generated on a frame 20B when the pressure of the oxygen-containing gas is higher than that of the hydrogen-containing gas, and code (Y) indicates a bending moment on the frame 20B generated when the pressure of the hydrogen-containing gas is higher than that of the oxygen-containing gas.

A fuel cell A3 according to the third embodiment of the present invention shown in FIG. 7(A) is different from the fuel cells A1, A2 in that projections 40b, 41b equivalent to the projections 21 are formed integrally with a pair of separators 40A and 41A.

The frame 20B shown in FIGS. 7(A), 7(B) is formed integrally with the membrane electrode assembly 30 by injection molding, for example. Meanwhile, in this embodiment, the frame 20B is formed into a horizontally long rectangle in a front view seen in the stacking direction α of the fuel cell A3, and is formed into a substantially uniform plate thickness. Moreover, the membrane electrode assembly 30 is located at the central part of the frame 20B in the vertical and horizontal directions. However, no projections are arranged on the membrane electrode assembly 30.

The multiple projections 40b are integrally formed in the regions of the separator 40A corresponding to the diffuser units D. The multiple projections 40b are formed into the same truncated cone shape of the same size and are arranged at given intervals.

The multiple projections 41b are integrally formed in the regions of the separator 41A corresponding to the diffuser units D. The multiple projections 41b are formed into the same truncated cone shape of the same size and are arranged at given intervals.

In this embodiment, the projections 40b on the anode side (the one surface side) of the separator 40A and the projections 41b on the cathode side (the other surface side) of the separator 41A are arranged asymmetrically with respect to the frame 20B in the stacking direction α of the fuel cell A3. That is to say, the projections 40b, 41b are arranged in such a manner that the gas flow paths S1 and the gas flow paths S2 are formed into asymmetrical shapes with respect to the frame 20B in the stacking direction α of the fuel cell A3.

In this embodiment, the projections 41b on the cathode side (the other surface side) are arranged opposite the gas flow paths S1 on the anode side (the one surface side), and the projections 40b on the anode side (the one surface side) are arranged opposite the gas flow paths S2 on the cathode side (the other surface side).

According to this embodiment, it is possible to displace positions where stresses are generated and distributions of the stresses in the frame 20B when differential pressures are generated. Thus, the stress amplitude can be reduced. In addition, the structural fatigue resistance can be increased without reducing a cross-sectional area for the flow of a reaction gas.

A fuel cell A4 according to the fourth embodiment of the present invention shown in FIG. 7(B) has different intervals of arrangement of the projections 40b, 41b from those in the fuel cell A3.

Specifically, the intervals of arrangement of the projections 40b, 41b in the fuel cell A4 are set wider than those in the fuel cell A3. In other words, the gas flow paths S1, S2 in the fuel cell A4 are formed to have wider dimensions than those of the gas flow paths S1, S2 in the fuel cell A3. An interval between a base portion of a certain projection 40b on the one surface side of the frame 20B and a corner portion of the corresponding projection 41b on the other surface side thereof is set to a dimension W2.

Here, as similar to the case of the fuel cell A2, the dimension W2 may be set in consideration of a factor such as the bending moment to be generated.

According to this embodiment, it is possible to displace positions where stresses are generated and distributions of the stresses in the frame 20B when differential pressures are generated. Thus, the stress amplitude can be reduced. In addition, the structural fatigue resistance can be increased without reducing a cross-sectional area for the flow of a reaction gas.

Figure 8:
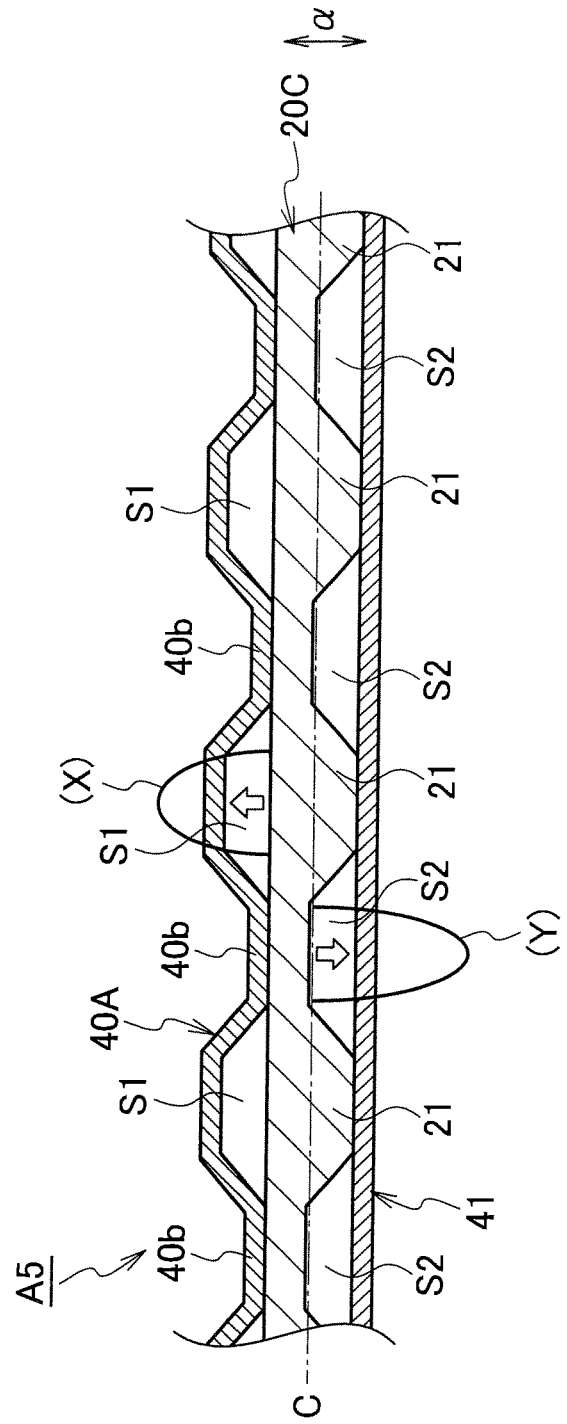
FIG. 8 is a partial cross-sectional view showing part of a fuel cell according to a fifth embodiment of the present invention.

FIG. 8 is a partial cross-sectional view showing a cross section of part of a fuel cell according to a fifth embodiment of the present invention. Each arrow shown in FIG. 8 indicates a differential pressure, code (X) indicates a bending moment generated on a frame 20C when the pressure of the oxygen-containing gas is higher than that of the hydrogen-containing gas, and code (Y) indicates a bending moment on the frame 20C generated when the pressure of the hydrogen-containing gas is higher than that of the oxygen-containing gas. Note that constituents equivalent to those explained in any of the above-described embodiments will be denoted by the same reference numerals and duplicate explanation will be omitted.

In a fuel cell A5 according to the fifth embodiment of the present invention, the membrane electrode assembly 30 having the frame 20C formed therearound is sandwiched between components equivalent to the separator 41 shown in FIG. 6 and the separator 40A shown in FIG. 7(A). Thus, the power generation unit G (not shown in FIG. 8) is formed in a region opposed to the membrane electrode assembly 30.

The frame 20C is formed integrally with the membrane electrode assembly 30 by injection molding, for example. In this embodiment, the frame 20C is formed into a horizontally long rectangle in a front view seen in the stacking direction α of the fuel cell A5. The frame 20C is formed into a substantially uniform plate thickness and the membrane electrode assembly 30 is located at a central part thereof.

In this frame 20C, the multiple projections 21 having the same truncated cone shape of the same size are arranged only on the cathode side of each diffuser unit D while the anode side thereof is formed into a flat surface.

In this embodiment, the projections 40b on the anode side (the one surface side) of the separator 40A and the projections 21 on the cathode side (the other surface side) of the frame 20C are arranged asymmetrically with respect to the central axis C of the frame 20C in the stacking direction α of the fuel cell A5. That is to say, the projections 40b, 21 are arranged in such a manner that the gas flow paths S1 and the gas flow paths S2 are formed into asymmetrical shapes with respect to the frame 20C in the stacking direction α of the fuel cell A5.

In this embodiment, the projections 40b of the separator 40A are arranged in positions opposed to the gas flow paths S2, which are formed by the projections 21 of the frame 20C and the separator 41.

According to this embodiment, it is possible to displace positions where stresses are generated and distributions of the stresses in the frame 20C when differential pressures are generated. Thus, the stress amplitude can be reduced. In addition, the structural fatigue resistance can be increased without reducing a cross-sectional area for the flow of a reaction gas. Moreover, the section modulus of each stress-generating portion can be increased by partially increasing the plate thickness of the frame 20C.

Figure 9:
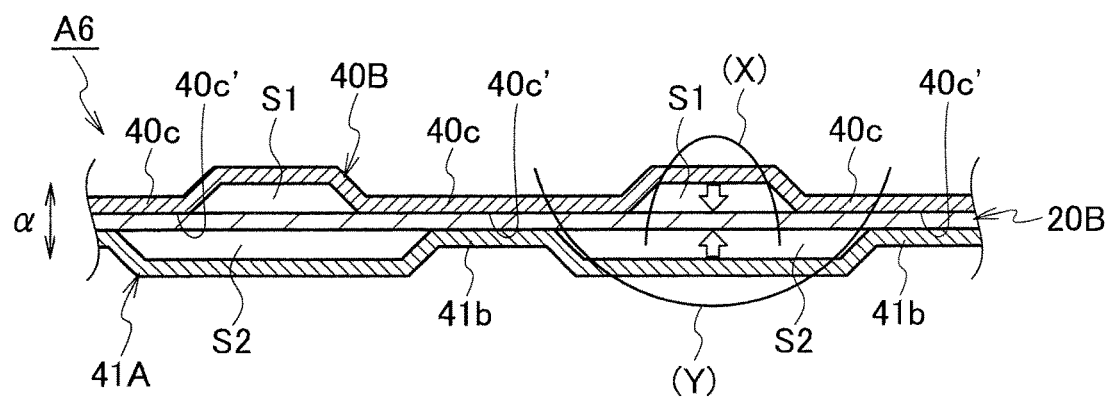
FIG. 9 is a partial cross-sectional view showing part of a fuel cell according to a sixth embodiment of the present invention.

FIG. 9 is a partial cross-sectional view showing a cross section of part of a fuel cell according to a sixth embodiment of the present invention. Each arrow shown in FIG. 9 indicates a differential pressure, code (X) indicates a bending moment generated on the frame 20B when the pressure of the oxygen-containing gas is higher than that of the hydrogen-containing gas, and code (Y) indicates a bending moment on the frame 20B generated when the pressure of the hydrogen-containing gas is higher than that of the oxygen-containing gas. Note that constituents equivalent to those explained in the above-described embodiments will be denoted by the same reference numerals and duplicate explanation will be omitted.

A fuel cell A6 according to the sixth embodiment of the present invention is designed to sandwich the membrane electrode assembly 30 (not shown in FIG. 9), which has a component equivalent to the frame 20B shown in FIGS. 7(A), 7(B) formed therearound, between components equivalent to the separator 40B and the separator 41A shown in FIG. 7(B).

Multiple projections 40c are integrally formed in regions of the separator 40B corresponding to the diffuser units D.

The multiple projections 40c having the same truncated cone shape of the same size are arranged at given intervals. Here, the area of a contact surface 40c' of each projection 40c in contact with the frame 20B is increased as compared to that of the projection 40b (41b).

In this embodiment, the projections 40c of the separator 40B are arranged opposite the projections 41b of the separator 41A.

In this embodiment, the projections 40c on the anode side (the one surface side) of the separator 40B and the projections 41b on the cathode side (the other surface side) of the separator 41A are arranged asymmetrically with respect to the frame 20B in the stacking direction α of the fuel cell A6. That is to say, the projections 40c, 41b are arranged in such a manner that the gas flow paths S1 and the gas flow paths S2 are formed into asymmetrical shapes with respect to the frame 20B in the stacking direction α of the fuel cell A6.

According to this embodiment, it is possible to displace positions where stresses are generated and distributions of the stresses in the frame 20B when differential pressures are generated. Thus, the stress amplitude can be reduced. In addition, the structural fatigue resistance can be increased without reducing a cross-sectional area for the flow of a reaction gas.

Figure 10:
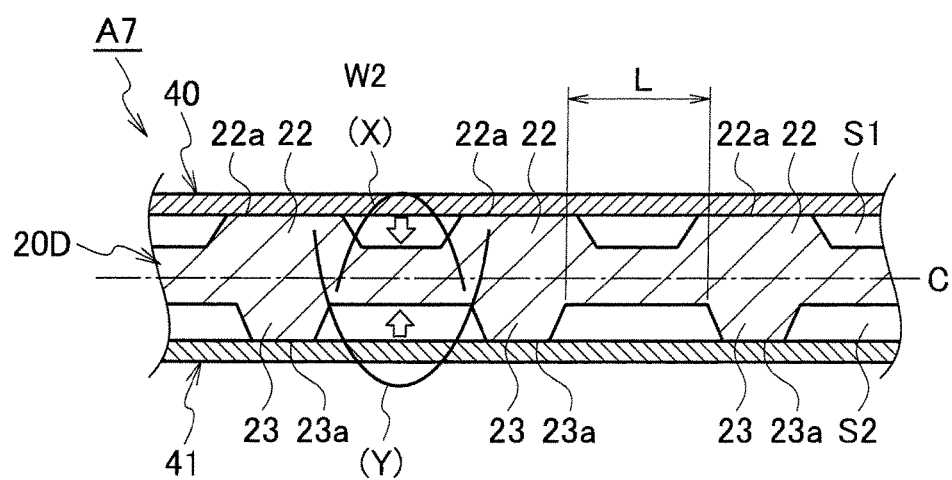
FIG. 10 is a partial cross-sectional view showing part of a fuel cell according to a seventh embodiment of the present invention.

FIG. 10 is a partial cross-sectional view showing a cross section of part of a fuel cell according to a seventh embodiment of the present invention. Each arrow shown in FIG. 10 indicates a differential pressure, code (X) indicates a bending moment generated on a frame 20D when the pressure of the oxygen-containing gas is higher than that of the hydrogen-containing gas, and code (Y) indicates a bending moment on the frame 20D generated when the pressure of the hydrogen-containing gas is higher than that of the oxygen-containing gas. Note that constituents equivalent to those explained in the above-described embodiments will be denoted by the same reference numerals and duplicate explanation will be omitted.

A fuel cell A7 according to the seventh embodiment of the present invention is designed to sandwich the membrane electrode assembly 30 (not shown in FIG. 10), which has the frame 20D formed therearound, between components equivalent to the pair of separators 40, 41 shown in FIG. 6.

The frame 20D is formed integrally with the membrane electrode assembly 30 by injection molding, for example. In this embodiment, the frame 20D is formed into a horizontally long rectangle in a front view seen in the stacking direction α of the fuel cell A7, and is formed into a substantially uniform plate thickness. In addition, the membrane electrode assembly 30 (not shown) is located at a central part of the frame 20D.

The frame 20D has a structure in which multiple projections 22 are arranged on a surface on the anode side of the frame 20D and multiple projections 23 are arranged on a surface on the cathode side thereof, the projections 22, 23 having different sizes. Each of the projections 22, 23 is formed into a truncated cone shape. The area of a contact surface 22a of each projection 22 with the separator 40 is made larger than the area of a contact surface 23a of each projection 23 with the separator 41. Moreover, each projection 22 and the corresponding projection 23 are arranged opposed to each other.

In this embodiment, the projections 22 on the anode side (the one surface side) of the frame 20D and the projections 23 on the cathode side (the other surface side) of the frame 20D are arranged asymmetrically with respect to the central axis C of the frame 20D in the stacking direction α of the fuel cell A7. That is to say, the projections 22, 23 are arranged in such a manner that the gas flow paths S1 and the gas flow paths S2 are formed into asymmetrical shapes with respect to the frame 20D in the stacking direction α of the fuel cell A7. Here, an interval between base portions of the adjacent projections 23 is set to a dimension L.

According to this embodiment, it is possible to displace positions where stresses are generated and distributions of the stresses in the frame 20D when differential pressures are generated. Thus, the stress amplitude can be reduced. In addition, the structural fatigue resistance can be increased without reducing a cross-sectional area for the flow of a reaction gas. Moreover, the section modulus of each stress-generating portion can be increased by partially increasing the plate thickness of the frame 20D.

It is to be noted that the present invention is not limited only to the above-described embodiments but the following modifications can also be embodied.

The above-described embodiments show the projections in the truncated cone shapes as examples. However, columnar shapes, prismatic shapes, elliptic cylindrical shapes, and other publicly known shapes may be employed as the shapes of the projections.

The configuration described in each of the embodiments is not applicable only to the relevant embodiment. The configuration described in one of the embodiments may be applied, with or without modifications, to any other embodiments. In addition, the configurations may be arbitrarily combined.

It is to be noted that the entire contents of Japanese Patent Application No. 2011-083533 (filing date: Apr. 5, 2011) are incorporated herein by reference.

While the contents of the present invention have been described based on the embodiments, it is obvious to those skilled in the art that the present invention is not limited only to the descriptions herein but various modifications and improvements can be made thereto.

INDUSTRIAL APPLICABILITY

According to the present invention, it is possible to displace positions where stresses are generated and distributions of the stresses in the frame body when differential pressures are generated. Thus, the structural fatigue resistance can be increased without reducing a cross-sectional area for the flow of a reaction gas.

REFERENCE SIGNS LIST 20, 20A, 20B, 20C, 20D frame body (frame)
21, 22, 23, 40b, 41b, 40c projection
30 membrane electrode assembly
40, 41, 40A, 40B separator
A1 to A7 fuel cell
D communication region (diffuser unit)
S1, S2 gas flow path

The invention claimed is:

1. A fuel cell comprising:
a frame body having a membrane electrode assembly;
a pair of separators configured to sandwich the frame body from two surface sides;
a plurality of projections arranged at given intervals on each of the two surface sides of the frame body;
a gas flow path for a hydrogen-containing gas formed on one surface side of the frame body;
a gas flow path for an oxygen-containing gas formed on the other surface side of the frame body; and
a plurality of diffuser units, which are regions outside a region provided with the membrane electrode assembly, and which are regions where the gas flow path for the hydrogen-containing gas and the gas flow path for the oxygen-containing gas are overlapped across the frame body, wherein
each projection has a contact surface which is formed on one of the frame body or a separator, the contact surface being in contact with the other of the frame body or the separator, and
the projections on the one surface side of the frame body and the projections on the other surface side thereof are arranged on the diffuser units asymmetrically with respect to the frame body in a stacking direction of the fuel cell such that when differential pressures are generated between pressure of the oxygen-containing gas and pressure of the hydrogen-containing gas, positions where stresses are generated and distributions of the stresses in the frame body are displaced.

2. The fuel cell according to claim 1, wherein the projections are arranged in such a manner that the gas flow path for the hydrogen-containing gas and the gas flow path for the oxygen-containing gas are formed into asymmetrical shapes with respect to the frame body in the stacking direction of the fuel cell.

3. The fuel cell according to claim 1, wherein the plurality of projections are formed integrally with the frame body.

4. The fuel cell according to claim 1, wherein the plurality of projections are formed integrally with at least one of the pair of separators.

5. The fuel cell according to claim 1, wherein the plurality of projections are formed integrally with both of the pair of separators.

6. The fuel cell according to claim 5, wherein a contact area by which each projection of one of the separators is in contact with the frame body and a contact area by which each projection of the other separator is in contact with the frame body are different from each other.

7. The fuel cell according to claim 6, wherein each projection of the one separator and the corresponding projection of the other separator are arranged opposed to each other.

8. The fuel cell according to claim 1, wherein a contact area by which each projection formed on one surface of the frame body is in contact with the corresponding separator and a contact area by which each projection formed on the other surface thereof is in contact with the corresponding separator are different from each other.

9. The fuel cell according to claim 8, wherein each projection formed on the one surface of the frame body and the corresponding projection formed on the other surface thereof are arranged opposed to each other.

10. The fuel cell according to claim 1, wherein there is no overlap between the plurality of diffuser units and manifold units configured for supplying and discharging any of the hydrogen-containing gas or the oxygen-containing gas.

11. The fuel cell according to claim 10, wherein there is no overlap between the plurality of diffuser units and the membrane electrode assembly.

12. The fuel cell according to claim 1, wherein the contact surface of each projection is formed on the frame body, and the contact surface is in contact with the separator.

13. The fuel cell according to claim 1, wherein the contact surface of each projection is formed on the separator, and the contact surface is in contact with the frame body.

14. The fuel cell according to claim 1, wherein the contact surface of each projection is a flat surface.

15. A fuel cell comprising:
a frame body having a membrane electrode assembly;
a pair of separators configured to sandwich the frame body from two surface sides;
a plurality of projections arranged at given intervals on each of the two surface sides of the frame body;
a gas flow path for a hydrogen-containing gas formed on one surface side of the frame body;
a gas flow path for an oxygen-containing gas formed on the other surface side of the frame body; and
a plurality of diffuser units, which are regions outside a region provided with the membrane electrode assembly, and which are regions where the gas flow path for the hydrogen-containing gas and the gas flow path for the oxygen-containing gas are overlapped across the frame body, wherein each projection has a contact surface which is formed on one of the frame body or a separator, the contact surface being in contact with the other of the frame body or the separator, the projections on the one surface side of the frame body and the projections on the other surface side thereof are arranged on the diffuser units asymmetrically with respect to the frame body in a stacking direction of the fuel cell, and the contact surface of each projection is a flat surface.

* * * * *